(12) United States Patent
Miller

(10) Patent No.: US 7,084,284 B2
(45) Date of Patent: Aug. 1, 2006

(54) SEPARATION PROCESS

(75) Inventor: Jay F. Miller, Chester Springs, PA (US)

(73) Assignee: Lyondell Chemical Technology, L.P., Greenville, DE (US)

(*) Notice: Subject to any disclaimer, the term of this patent is extended or adjusted under 35 U.S.C. 154(b) by 47 days.

(21) Appl. No.: 10/990,028

(22) Filed: Nov. 16, 2004

(65) Prior Publication Data

US 2006/0106237 A1    May 18, 2006

(51) Int. Cl.
*C07D 303/06* (2006.01)

(52) U.S. Cl. ........................ 549/541; 549/542
(58) Field of Classification Search ............ 549/541, 549/542
See application file for complete search history.

(56) References Cited

U.S. PATENT DOCUMENTS

| | | | |
|---|---|---|---|
| 5,248,794 A * | 9/1993 | Chappell et al. | 549/541 |
| 5,440,058 A * | 8/1995 | Hoffman et al. | 549/538 |
| 5,681,473 A | 10/1997 | Miller et al. | |
| 6,005,123 A | 12/1999 | Dessau et al. | |

OTHER PUBLICATIONS

Kirk-Othmer Encyclopedia of Chemical Technology 4th Edition, vol. 16, pp. 137-153.

* cited by examiner

*Primary Examiner*—Cecilia J. Tsang
*Assistant Examiner*—Raymond Covington
(74) *Attorney, Agent, or Firm*—William C. Long

(57) ABSTRACT

Phosphine and/or phosphine oxide promoters are effectively separated from propylene oxide reaction solvents through use of a membrane effective to retain the phosphine and/or phosphine oxide.

3 Claims, 1 Drawing Sheet

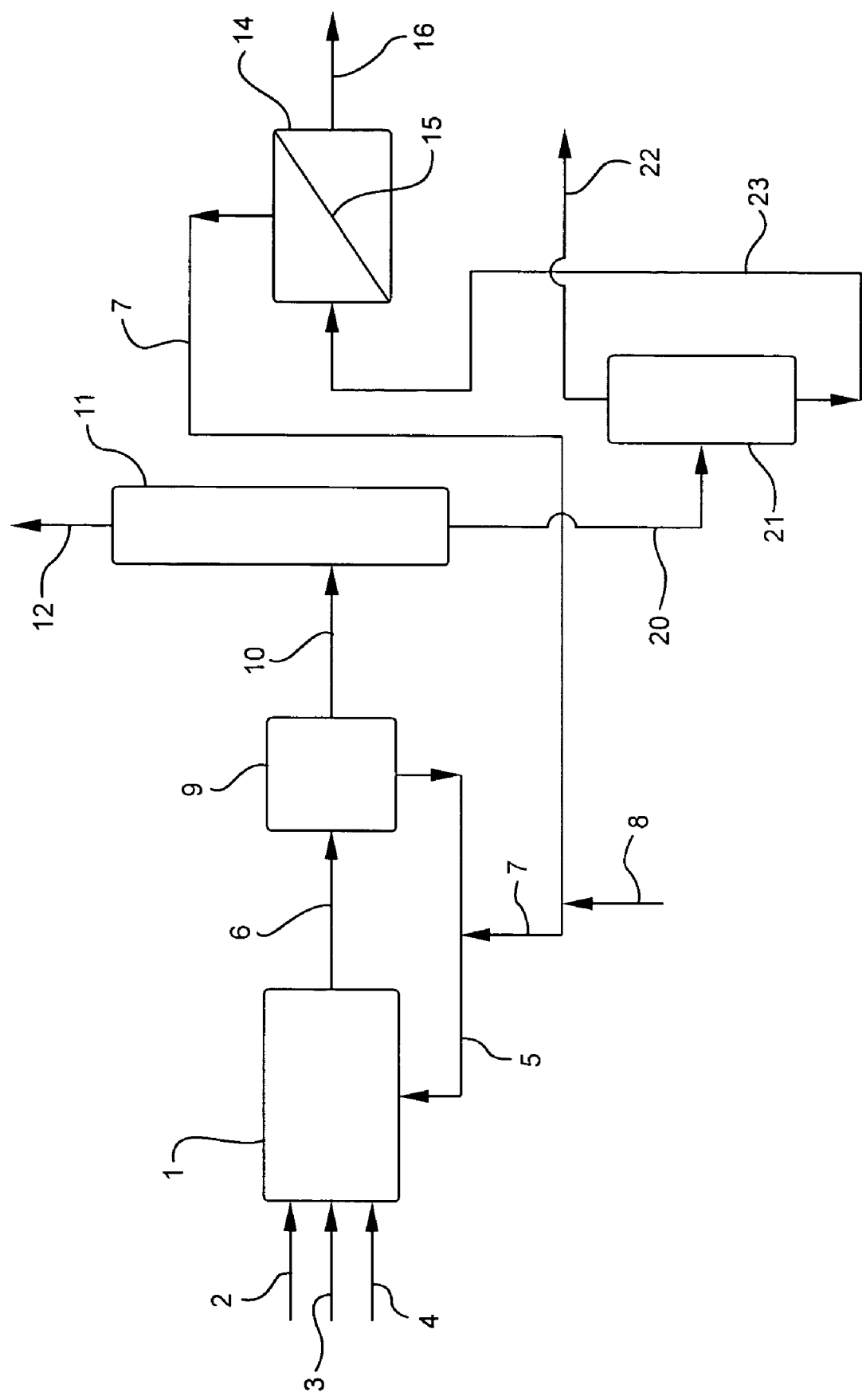

SEPARATION PROCESS

BACKGROUND OF THE INVENTION

1. Field of the Invention

The process of the invention relates to a process for the separation of organic phosphines and/or phosphine oxides from solvents such as are used for the production of propylene oxide and especially to the recovery and recycle of organic phosphines and/or phosphine oxides in a propylene oxide production process.

2. Background of the Invention

A great deal of effort has been expended on the development of a no coproduct direct oxidation process for the production of propylene oxide. U.S. Pat. No. 6,005,123 is illustrative of the encouraging results which have been achieved.

As reported in U.S. Pat. No. 6,005,123, propylene oxide can be prepared by reacting propylene, oxygen and hydrogen in the presence of a noble metal on titanium silicate catalyst, e.g. Pd on TS-1. Usually the solid catalyst is slurried in an appropriate solvent such as a methanol and water mixture during the reaction.

Especially advantageous results are achieved where reaction promoters of the phosphine or phosphine oxide type such as triphenyl phosphine are also present in the propylene oxide forming reaction mixture.

To enable phosphines and phosphine oxides to be used in a continuous chemical process they must be recycled. The use of phosphines and phosphine oxides is prohibitively expensive if the phosphines and phosphine oxides cannot be conveniently recycled for reuse. Unfortunately, a process in which methanol and/or water are used as solvents renders most of the typical unit operations unusable. As methanol is distilled, or stripped, from the reaction mixture the phosphines and phosphine oxides precipitate from solution, thus fouling the stills. Furthermore, the phosphines and phosphine oxides are not stable enough, or volatile enough, to distill overhead. Even if the water is somehow distilled overhead, while keeping the phosphine and phosphine oxides in a solution of PEG and other propylene oxide ring opened products, the separation of the ring opened products from the phosphine and phosphine oxides cannot be accomplished by distillation. Hence, distillation will not work.

Compounding the fact that distillation is not an option is that extraction technology will not work efficiently, either. Even if one could obtain the phosphine and phosphine oxides in a solution of ring opened products, solvents that will solvate the phosphines and phosphine oxides are miscible with the ring opened moieties. Even if a solvent could be found which could selectively extract the phosphines and phosphine oxides from the ring opened solution, this process would require more distillation operations in order to recycle the extraction solvent.

SUMMARY OF THE INVENTION

The present invention provides a process whereby a propylene oxide containing reaction mixture such as that produced according to U.S. Pat. No. 6,005,123 and containing phosphine and/or phosphine oxide promoters can be separated into a solvent and promoter fraction for recycle and a propylene oxide fraction for product recovery. The separation is accomplished by the use of membranes which function to allow passage of the solvent and propylene oxide in the permeate while retaining in the retentate the phosphine and/or phosphine oxide promoters for recycle.

DESCRIPTION OF THE DRAWING

The attached drawing illustrates schematically a practice of the invention.

DETAILED DESCRIPTION

An especially preferred practice of the invention is described in the attached FIGURE. Referring to the FIGURE, reactor 1 is a conventional reactor useful for reacting propylene, oxygen and hydrogen in a liquid slurry of solid noble metal on titanium silicalite catalyst to form propylene oxide. Propylene, oxygen and hydrogen are introduced via lines 2, 3 and 4 respectively. Solvent and catalyst are introduced via line 5. Make up solvent can also be added via line 5 (not shown). Known conditions effective to form propylene oxide are maintained in reactor 1 and the propylene oxide containing reaction mixture is removed via line 6.

A key feature is the provision of phosphine and/or phosphine oxide promoters in the epoxidation reaction mixture. These promoters are contained in recycle stream 7 and may be supplemented as needed via line 8.

The reaction mixture passes from reactor 1 via line 6 to separation zone 9 where solid catalyst is separated and recycled via line 5 along with solvent and some reactants and reaction products to reactor 1. Filtration, centrifugation, and the like are appropriate procedures for this separation.

From separation zone 9 a liquid stream comprised of solvent, propylene oxide, and other reaction materials together with the phosphine and/or phosphine oxide promoters passes via line 10 to distillation zone 11 wherein, in a preferred embodiment, various light materials such as propylene and propane are separated overhead via line 12 from the reaction liquid.

The bottoms stream from column 11 comprised of propylene oxide, ring opened organic products, solvent, the phosphine and/or phosphine oxide promoters in a preferred practice is passed via line 20 to distillation zone 21 wherein propylene oxide product is recovered overhead via line 22. The bottoms stream containing phosphine and/or phosphine oxide promoters passes via line 23 to zone 14 wherein this stream is contacted with an appropriate membrane 15 effective to separate the phosphines and/or phosphine oxides as retentate from the permeate which contains solvent, and ring opened materials.

The phosphine and/or phosphine oxide retentate passes via line 7 back to reactor 1 for reuse in the process while the permeate, via line 16, is sent to conventional separation means for recovery of propylene oxide product and the separation and recycle of solvent (not shown).

The membrane separation employed in accordance with the present invention involves the use of hydrophilic nanofiltration and reverse osmosis membranes. Many such membranes are well known in the art, with the best examples being poly(amides), e.g., Dow's Film Tec membranes, and other, more chemically stable, polymeric membranes, e.g., Koch's SelRO membranes as well as others. These membranes can be employed anywhere in the process—after the reactor and included in the separation train. One such place where the membranes can conveniently be employed is during processing of the effluent from the reactor, after the solid slurry catalyst has been removed, or after the reactor if the catalyst is used as a packed bed. It is especially preferred to use the membrane after the light gases, propylene and propane, have been removed from the mixture as illustrated in the drawing. The membrane will permeate the methanol, water, propylene oxide, and the ring opened species, while retaining the phosphine and phosphine oxides in solution as retendate. The permeated solution will go to the distillation and refining portion of the process, while the concentrated solution of phosphines and phosphine oxides in a solution of methanol, propylene oxide, water and ring opened products is recycled back to the reactor for reuse. As above indicated, the preferable method of using the membrane is after the light gases, propylene, propane and propylene oxide have been removed from the stream. In this case little or no propylene oxide will be recycled back to the reactor.

Membranes which are used in the separation of the invention are well known in the art. For the purpose of separating phosphines and/or phosphine oxides from the propylene oxide and solvent solution in accordance with the invention nanoporous or reverse osmosis membranes are employed which are stable in the presence of organic solvents such as methanol and propylene oxide. Illustrative of suitable membranes are the SelRO membranes from Koch Membrane Systems. Isotropic microporous membrane suitable for use are described in Kirk-Othmer, "Encyclopedia of Chemical Technology", Fourth Edition, Vol. 16, pages 137–153 (1995). Membranes such as those described in U.S. Pat. No. 5,681,473 at column 23, can also be used.

The membrane separation is carried out at conditions whereby a predominance, preferably at least 90% of the phosphine and/or phosphine oxide is retained in the retendate for recycle, while a predominance of the propylene oxide and solvent passes through as permeate to subsequent separation.

In the membrane separation of this invention, an organic solvent-resistant membrane composite is used which allows a substantial portion, e.g. 60% or more of the propylene oxide and organic solvent and water to pass through, while rejecting at least 90% by weight of phosphine and/or phosphine oxide. The membrane separation is a pressure-driven process and in general the pressure of the feed stream may range from a low of about 50 pounds per square inch and to a high of about 1500 pounds per square inch. More preferably the pressure of the feed stream of this invention is from about 100 psi to about 600 psi. The "permeate" is the stream which has passed through the membrane, and compared to the feed stream, the permeate is at a greatly reduced pressure. Typically, the permeate is near atmospheric pressure to 50 psi. The permeate contains a greatly reduced amount of the phosphine and/or phosphine oxide dissolved in the bulk of the organic solvent and product propylene oxide. Said permeate can be recovered in any conventional manner, e.g. by simply collecting it as a liquid. The retendate stream (also called the "concentrate" or "non-permeate" stream) is the stream that does not pass through the membrane. The retendate contains the bulk of the phosphine and/or phosphine oxide dissolved in organic solvent. The retendate stream is typically only slight lower in pressure than the feed stream and can be recycled back to the oxidation reactor for reuse.

The following exemplifies practice of the invention:

EXAMPLE

Propylene is reacted in a continuous reaction mode in reactor 1 with oxygen and hydrogen in a methanol/water solvent mixture using a slurried palladium on TS-1 (1.5 wt % Pd) catalyst in accordance with the process described in U.S. Pat. No. 6,005,123. Triphenyl phosphine in amount of about 0.1 wt % of the reaction mixture is used as promoter.

Liquid reaction mixture containing slurried catalyst is withdrawn from reactor 1 via line 6 and is passed to separator 9. Catalyst and solvent are recycled to reactor 1 via line 5 together with a recycle stream from separator 14 which is recycled via line 7.

From separator 9 a liquid reaction mixture stream is passed via line 10 to distillation column 11 and a lights stream is separated overhead via line 12. Bottoms from column 11 at 170° C. and 275 psig passes via line 20 to distillation column 21 and a product propylene oxide stream is recovered therefrom via line 22 at 120° C. and 100 psig.

Bottoms from column 21 passes via line 23 to separator 14 at 123° C. and 100 psig. A pump increases the pressure to 300 psi and the temperature is adjusted to 30° C. Separator 14 has positioned therein a hydrophilic nanofiltration membrane, Koch SELRO MPS-44, which essentially retains the triphenyl phosphine promoter while permeating the bulk of the ring opened organics, water and methanol.

The retendate is removed via line 7 at 30° C. and 290 psig and recycled to reactor 1 while the permeate is removed via line 16 at 30° C. and 20 psig for further separation.

The flow rates of the components of the various streams are given in the following Table 1 in pounds per hour.

TABLE 1

| | Stream | | | | | | |
|---|---|---|---|---|---|---|---|
| Component | 10 | 12 | 20 | 22 | 23 | 7 | 16 |
| $H_2O$ | 173.2 | | 173.2 | | 173.2 | 33.8 | 139.4 |
| TPP[1] | 0.01 | | 0.01 | | 0.01 | 0.0099 | 0.0001 |
| $C_3H_6$ | 18.8 | 18.8 | | | | | |
| $O_2$ | — | | | | | | |
| $H_2$ | — | | | | | | |
| Ballast | — | | | | | | |
| Methanol | 447.3 | | 447.3 | 40 | 407.3 | 79.5 | 327.8 |
| RO[2] | 8.3 | | 8.3 | | 8.3 | 1.6 | 6.7 |
| PO[3] | 69.9 | | 69.9 | 69.9 | | | |
| $C_3H_8$ | 3.1 | 3.1 | | | | | |
| Catalyst | | | | | | | |

[1]Triphenyl phosphine
[2]Ring opened organics
[3]Propylene oxide

From this example it can be seen that the process of the invention effectively separates the triphenyl phosphine for recycle.

I claim:

1. The process for the production of propylene oxide by reaction of propylene, oxygen and hydrogen in a liquid solvent in the presence of a solid catalyst and a phosphine and/or phosphine oxide promoter, which comprises
   a) reacting propylene, oxygen and hydrogen in a liquid solvent in the presence of a solid catalyst and a phosphine and/or phosphine oxide promoter to form a reaction mixture comprised of propylene oxide,
   b) separating solid catalyst from said reaction mixture,
   c) contacting the mixture from which solid catalyst has been separated either before or after separation of propylene oxide with a membrane effective to retain phosphine and/or phosphine oxide promoter while permitting passage of solvent and propylene oxide, and
   d) recycling at least a portion of retained phosphine and/or phosphine oxide promoter from step c) to step a).

2. The process of claim 1 wherein the promoter is triphenyl phosphine.

3. The process of claim 1 wherein the membrane is a hydrophilic nanofiltration or reverse osmosis membrane.

* * * * *